(12) United States Patent
Chu

(10) Patent No.: US 7,349,383 B2
(45) Date of Patent: Mar. 25, 2008

(54) METHOD AND APPARATUS FOR LOW-LATENCY, SEMANTIC CONVEYANCE OF AN ANSWER TONE OVER A DATA NETWORK

(75) Inventor: Keith T. Chu, Laguna Nigel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1043 days.

(21) Appl. No.: 10/253,352

(22) Filed: Sep. 24, 2002

(65) Prior Publication Data

US 2003/0095544 A1 May 22, 2003

Related U.S. Application Data

(60) Provisional application No. 60/332,075, filed on Nov. 20, 2001.

(51) Int. Cl.
*H04L 12/56* (2006.01)
*H04L 12/66* (2006.01)

(52) U.S. Cl. ............... 370/352; 370/401; 375/222
(58) Field of Classification Search ........ 370/252, 370/278, 352, 400, 401, 356, 286; 379/100.17, 379/100.06; 375/222
See application file for complete search history.

(56) References Cited

U.S. PATENT DOCUMENTS

| | | | |
|---|---|---|---|
| 5,787,116 A * | 7/1998 | Lam et al. | 375/222 |
| 6,819,750 B1 * | 11/2004 | Mehta et al. | 379/100.17 |
| 2001/0046259 A1 * | 11/2001 | Abrishami | 375/222 |
| 2002/0131415 A1 * | 9/2002 | Guven et al. | 370/394 |

* cited by examiner

*Primary Examiner*—Chi Pham
*Assistant Examiner*—Saba Tsegaye
(74) *Attorney, Agent, or Firm*—Farjami & Farjami LLP

(57) ABSTRACT

Answer tone received at answering-side gateway and first classification signal is transmitted to a calling-side gateway that generates an answer tone in response to the signal. A second classification signal may be transmitted to the calling-side gateway that adjusts the answer tone in response to the second signal.

14 Claims, 7 Drawing Sheets

METHOD AND APPARATUS FOR LOW-LATENCY, SEMANTIC CONVEYANCE OF AN ANSWER TONE OVER A DATA NETWORK

This present application is related to a provisional application Ser. No. 60/332,075 filed on Nov. 20, 2001, entitled "Answer Tone Semantic Preservation for Modem over IP", by K. Chu, currently pending, for which the priority date for this application is hereby claimed.

BACKGROUND OF THE INVENTION

1. Technical Field

The present invention relates generally to establishing communication between two modems and, more particularly, is directed to an apparatus and method for propagating an answer tone between modems in communication over a data network.

2. Description of the Prior Art

Land based telephone systems have been in existence for many years. These telephone networks use twisted pair copper telephone wire to connect telephones and other equipment to a centralized Public Switched Telephone Network (PSTN). The connection to the PSTN is normally made through a Central Office (CO). Until recently, traditional telephony functions such as voice conversations had been the predominant type of traffic carried by the PSTN. With the advent of the Internet and the World Wide Web, the twisted pair wires in existing telephone networks are carrying increasing amounts of digitized data.

Full duplex voice communications are carried either by 4-wire circuits or by 2-wire circuits. The 2-wire circuits are usually used in a local loop portion of the telephone system. The local loop is the connection between the telephone subscriber and the telephone central office. Four wire circuits have traditionally been used for long-haul communications, e.g. from one central office to another. Four-wire circuits typically comprise a 2-wire send path and a 2-wire receive path.

Hybrid circuits are used to convert the 2-wire local loop into a 4-wire circuit. Since these hybrid circuits are not perfect, they may reflect a portion of the signal received on the receive path of a 4-wire circuit back into the send path. This results in an echo. In order to combat the echo problem, echo cancelers and echo suppressors have been introduced into the PSTN signal path. Echo suppressors impose a time-varying attenuation of the signal received on the receive path of a long-haul connection. Echo cancelers anticipate the echo that may be reflected into the receive path (from the "send path" at the remote end of the connection) and attempt to subtract only the anticipated echo rather than attenuating the entire signal.

Facsimile (fax) machines and analog modems communicate digital data over analog telephone lines. Fax machines and modems are designed to convey outgoing digital data streams as modulated analog signals. Accordingly, fax machines and modems demodulate incoming analog signals and convert them into a digital data stream. Echo suppressors that may be present in the telephone signal path may cause problems for fax machines and analog modems. Because some types of modems employ their own echo cancelers, echo cancelers comprising the telephone infrastructure may need to be disabled.

In an effort to standardize methods for disabling echo cancelers and suppressors, the Telecommunication Standardization Sector of the International Telecommunications Union (ITU-T) has defined a "G-series" of design recommendations. These design recommendations, which include G.164, G.165 and G.168, define how echo suppressors and cancelers may be disabled through the use of an answer tone. Hence, an echo suppressor or canceler that is designed according to these recommendations will disable its function when it perceives a particular answer tone.

Modem and fax design specifications have also been promulgated by the industry. These specifications specify the use of an answer tone by a modem or fax machine when an echo suppressor or canceler needs to be disabled. These modem and fax design specifications roughly correspond to the "G-series" recommendations that steer the design of echo suppressors and echo cancelers. Three significant modem specifications are the V.25 specification, the V.32 specification and the V.8 specification.

The G.164 Recommendation is directed towards echo suppressors. Fax machines are half-duplex in nature. Hence, an echo suppressor that attenuates the receive path of a 4-wire circuit may adversely affect the operation of a fax machine. Fax machines conforming to ITU-T Recommendation T.30 use a simple 2100 Hz answer tone, as specified in the G.164 Recommendation, to disable echo suppressors. This variant of an answer tone does not disable echo cancelers. Fax machines actually rely on echo cancelers to eliminate echo artifacts from the receive path which might otherwise be misinterpreted as the beginning of a new transmission from a remote fax machine.

The G.165 and G.168 recommendations specify a means for disabling echo cancelers present in the telephone signal path servicing a modem connection. This allows modems to use their own internal echo cancellation without interference from the echo cancelers present in the telephone signal path connecting two modems. In accordance with G.165 and G.168, echo cancelers will disable themselves when they detect a 2100 Hz tone that periodically exhibits 180° phase reversals. The phase reversals typically occur every 450 milliseconds (ms). The V.8 modem specification defines yet another variant of an answer tone. The 2100 Hz tone with phase reversals, as described in the G.165 recommendation, is amplitude modulated by a low frequency carrier of 15 Hz.

Through evolution of modem technology, a wide variety of answer tones have been defined and are now in use. The type of answer tone used by a particular type of fax machine or modem may depend on the type of echo suppression or echo cancellation that may need to be disabled or maintained as two modem devices communicate with each other over a phone connection.

Modern telephone infrastructures are based primarily on digitized communications systems. Typically, a central office services a subscriber's facility with an analog telephone connection. In the central office, the analog signaling used to communicate with a telephone, modem or fax machine at a subscribers facility is typically converted to a stream of inbound and outbound data. The conversion is typically accomplished by a circuit called coder/decoder (codec). The digitized data can then be conveyed to a public switched telephone network (PSTN). The PSTN is formed by a series of interconnected time division multiplexed, constant rate data networks. The PSTN is a controlled latency digital communications network that can be used to establish "virtual circuits" from one subscriber to another. From a subscribers perspective, voice communications carried by the PSTN are clear and instantaneous.

Controlled latency networks are expensive to install and operate. Hence, it becomes advantageous to telephone companies and subscribers alike if viable alternatives to the PSTN could be used. Many telephone companies have started using general purpose data networks to carry voice communications on an experimental basis. One class of voice service supported by general purpose data networks is known as Voice over Internet Protocol (VoIP).

VoIP service digitizes analog telephony and uses a packet data network to establish a voice channel with another subscriber. Even though VoIP attempts to control quality, this class of service is characterized by significantly garbled and delayed voice quality due to the fact that a packet data network cannot control network jitter or latency as well as the PSTN. Even more disabling to VoIP quality is the fact that a packet network can loose packets altogether; a phenomenon not exhibited in PSTN communications.

In order to establish a VoIP connection, the telephone company central office must still digitize the analog telephone signals that it receives from the subscriber's facility. However, in contrast to standard telephone service where the digitized telephony is conveyed to the controlled latency PSTN, the digitized telephony signal is directed to a packet network. This is typically accomplished by a packet network access gateway that digitized the subscriber's signal and directs the digitized signal to a packet network. In one common alternative structure, the access gateway may receive digitized data from a subscriber interface unit (SIU) that may intelligently select VoIP when it is prudent or allowable to do so. The SIU typically comprises a codec and the requisite control circuitry to convey digitized telephony to either the PSTN network or to the access gateway.

Another problem associated with VoIP service pertains to the use of modems or fax machines over a voice channel that is carried by a digital communications channel established through a packet network. A VoIP connection typically comprises an analog phone in communication with another analog phone over a data network. The connection is typically established when a calling phone transmits an analog signal to a calling-side gateway. The analog signal is received by the calling-side gateway and is digitized using a codec. The digitized signal may then be transmitted over the data network from the calling-side gateway to an answering-side gateway. The answering-side gateway typically receives the digitized telephony data and converts it to an analog signal using another codec. This analog signal may then be directed to the answering telephone instrument.

When a fax machine or modem is attached to an analog telephone line serviced by an access gateway, the modulated analog signal it generates must be converted to a digital data stream by a codec. This digital data stream can then be conveyed to an answering-side gateway using a data network. This is conspicuously inefficient in light of the fact that the fax machine or modem originally created the modulated analog signal from a digital data stream. It would be more efficient to convey the original data stream over the data network in lieu of a digitized rendition of the modulated analog signal.

A more efficient way of operating fax machines or modems in conjunction with an access gateway is a relatively new class of service called Modem over Internet Protocol (MoIP). In MoIP, an access gateway further comprises a modem that intercepts the modulated analog signal generated by a fax machine or a modem connected to an analog telephone interface comprising the gateway. A calling modem receives digital data from a computer and modulates an analog signal according to the digital data. The modulated analog signal is transmitted to a calling-side gateway where it is demodulated by the modem comprising the gateway and converted back into a digital data stream. The digital data stream is then conveyed across the data network to an answering-side gateway. The answering-side gateway receives the digital data stream from the data network. A modem comprising the answering-side gateway converts the received digital data stream into a modulated analog signal. The modulated analog signal may then be directed to an answering modem.

When a modem first initiates a call through a calling-side gateway, the calling-side gateway presumes the call originated from a telephone. In response, a voice channel is established between the calling-side gateway and an answering-side gateway by creating a VoIP connection. The VoIP connection is completed when the answering-side gateway propagates the telephone call to an answering modem.

When the answering modem answers the VoIP call, it responds by transmitting an answer tone. When the answering-side gateway detects the answer tone from the answering modem, it realizes that a modem or fax session is about the begin using the VoIP connection. Responding to the answer tone, the answering-side gateway tears down the VoIP connection and establishes a MoIP connection. The answering-side gateway typically prevents the answer tone from reaching the calling-side gateway through the VoIP connection.

In furtherance of establishing the MoIP connection, the answering-side gateway signals the calling-side gateway that it has detected an answer tone. Once the calling-side gateway receives this signal, it regenerates the answer tone and conveys the regenerated tone back to the calling modem. Typically, this signal indicates not only that the answering-side gateway received an answer tone; it also indicates the type of answer tone received.

One problem with MoIP is that modems and Fax machines that are designed to be used over the PSTN network often fail to connect when attempting to communicate over a data network. This is sometimes due to the latency associated with regenerating the answer tone back to the calling modem from the calling-side gateway. A significant amount of time may be lost as an answering-side gateway attempts to identify the type of answer tone received prior to signaling the calling-side gateway.

SUMMARY OF THE INVENTION

Expedient identification of an answer tone received by an answering-side gateway is one aspect of an illustrative method according to the present invention. In order to reduce the latency associated with prior art methods of identifying an answer tone and then signaling a calling-side gateway, the present invention comprises a method whereby the answering-side gateway performs a multiple step identification process. As soon as specific characteristics of an answer tone can be recognized, the method of the present invention provides for sending a signal to a calling-side gateway that needs to regenerate the answer tone. As further classification of the answer tone can be accomplished, subsequent signals may be conveyed to the calling-side access gateway so that the regenerated answer tone can be adjusted accordingly.

One illustrative method for notifying a calling-side gateway that an answering-side gateway has detected an answer tone provides for receiving a first answer tone generated by an answering modem at the answering-side gateway. The answering-side gateway may then perform a first level classification of the answer tone. According to one illustrative method, the present invention provides that a first level classification comprises the determination of whether or not the answer tone is carried by a carrier signal. In some embodiments, the answer tone may be an amplitude modulated carrier signal at approximately 15 hertz commensurate with an answer tone defined in the V.8 modem specification.

Once this first level classification is complete, the method of the present invention provides for conveying a first signal indicative of the first classification from the answering-side gateway to the calling-side gateway. In response, this illustrative method provides that the calling-side gateway regenerate an answer tone commensurate with the first classification. Hence, in one derivative method the answer tone regenerated by the calling-side gateway may be used to amplitude modulated a carrier signal if the first classification indicates that the answer tone received by the answering-side gateway was amplitude modulating a carrier.

The illustrative method taught here further provides that the answering-side gateway continue to monitor the first answer tone in order that subsequent classifications may be performed. Once a subsequent classification is accomplished, additional signaling may be dispatched to the calling-side gateway so that the regenerated answer tone may be adjusted commensurate with the subsequent classification. According to one variation of this illustrative method, a second classification may comprise determination of whether or not the answer tone received by the answering-side gateway (i.e. first answer tone) exhibits phase reversals. If the first answer tone exhibits phase reversals, the calling-side gateway is notified so that the regenerated answer tone (i.e. second answer tone) may be adjusted causing the second answer tone to exhibits phase reversals. According to one other variation of this method, phase reversals may be recognized on a periodic basis wherein the period between phase reversals is approximately 450 ms. According to various methods comprising the present invention, the calling-side gateway may receive signals that comprise either a first or second level classification that is contained in a message addressed to the calling-side gateway.

Because a calling modem typically initiates a data call using a voice channel, the answering-side gateway may tear down the voice channel if it recognizes an answer tone generated by an answering modem. The voice channel may be established when a calling modem calls the answering modem through the calling-side gateway. A codec comprising the calling-side gateway typically digitizes analog signals from the calling modem in order to generate a digital data stream that may be conveyed to the answering-side gateway through a data network. A corresponding codec in the answering-side gateway converts the digital data stream into an analog signal that may be presented to the answering modem. In one variation of this method, the answering-side gateway may preclude the answer tone from reaching the voice channel entirely. By so doing, the answer tone received by the answering-side gateway is not converted into a digital representation by the codec that may comprise the answering-side gateway. The answering-side gateway typically establishes a MoIP connection with the calling-side gateway once the first answer tone is recognized.

The present invention further comprises an access gateway that may be used for connecting a modem capable of answering a data call to a data network. Such an access gateway may comprise an analog telephone interface, a modem circuit, an tone classifier, a tone processor and a network interface. According to this illustrative embodiment of the present invention, the analog telephone interface allows an answering modem to be connected to the access gateway. The modem circuit comprising the gateway may be used to demodulate a modulated analog signal that is generated by the answering modem. This modem circuit may generate a digital data stream from the modulated analog signal.

The tone classifier may be used to classify an answer tone on at least a first and second level. The tone processor typically receives the modulated analog signal from the answering modem. If the modulated analog signal contains an answer tone, a switching unit comprising the tone processor may direct the modulated analog signal to the tone classifier. If the modulated analog signal does not contain an answer tone, the switching unit may direct the modulated analog signal to the modem circuit. When an answer tone is directed to the tone processor, it will perform a first-level classification of the answer tone. According to at least one embodiment, this first-level classification is accomplished by a carrier detector comprising the tone classifier that is able to detect if the answer tone is modulating a carrier signal. In some embodiments, the carrier detector may recognize a 15 hertz carrier signal.

The network interface may receive a first-level classification flag from the tone classifier and respond by dispatching a tone event message to a calling-side gateway. The tone event message typically comprises the first-level classification flag so that a calling-side gateway may determine if a regenerated answer tone should be used to modulate a carrier signal.

The network interface may receive a second-level classification flag from the tone classifier once the tone classifier has further classified the answer tone received from the answering modem. A second-level classification may comprise determination of whether or not the first answer tone comprises phase reversals. Such phase reversals may occur with a period of approximately 450 ms. In this event, a subsequent tone event message may be dispatched to the calling-side gateway. In response, the calling-side gateway may adjust the answer tone to reflect the further classification of the first answer tone accomplished by the answering-side gateway. Hence, in one embodiment, the calling-side gateway may cause the regenerated second answer tone to exhibit phase reversals. Such phase reversals may be caused to occur approximately every 450 ms.

According to one example embodiment of the present invention, the network interface may comprise a message assembler. The message assembler may receive an address for the calling-side gateway and a first or second level classification flag. The message assembler combines these into an answer tone event message that may be conveyed to a data network.

If the modulated analog signal is directed to the modem circuit, the modem circuit is allowed to demodulate the analog signal in order to develop a digital data stream that may then be conveyed to the network interface. According to one alternative embodiment of the present invention, the answering-side gateway may further comprise a codec so that analog telephony received by way of the analog interface may be converted into a digital data stream and conveyed to the network interface.

The present invention further comprises a local access gateway that may be used to connect a data network to a calling modem. The gateway of the present invention is capable or regenerating an answer tone according to a signal received from the data network and subsequently adjusting the answer tone in accordance with a subsequent classification signal it may receive from the data network. Such a gateway typically comprises a local analog interface that may be used to connect the gateway to the modem. The gateway further comprises a network interface for attaching the gateway to a data network.

In operation as a calling-side gateway, the present invention typically receives a signal from the data network through the network interface indicating that an answer tone was perceived by an answering-side gateway. In response to the signal, a tone generator comprising the gateway may generate a second answer tone in accordance with a first level classification flag that may comprise the signal. The network interface may receive a subsequent signal from the data network and may forward this signal to the tone generator. The tone generator may adjust the regenerated second answer tone if it receives a subsequent classification flag from the network interface.

In one embodiment of the present invention, the tone generator may comprise a modulator that generates a carrier signal modulated by an answer tone if the first signal received from the data network indicates that the answering-side gateway perceived an answer tone that was modulating a carrier. The carrier signal may be 15 hertz and may be amplitude modulated by the regenerated answer tone. The tone generator comprising a gateway used as a calling-side device may further adjust the answer tone in response to a subsequent classification flag that is a second-level classification flag. In this alternative embodiment, the tone generator may comprise a phase reverser that cause the regenerated answer tone to comprise phase reversals if the second-level classification flag indicates that the answering-side gateway perceived phase reversal in the answer tone generated by the answering modem. The phase reversal may occur approximately every 450 ms.

The gateway of the present invention that may be used as a calling-side device may further comprise a codec. The codec may generate a digital representation of analog telephony received in the gateway by way of the analog telephone interface. This representation may be in the form of a digital data stream. The resultant data stream may be conveyed to the network interface which will forward the digitized telephony signal to a data network.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

Figure 1:
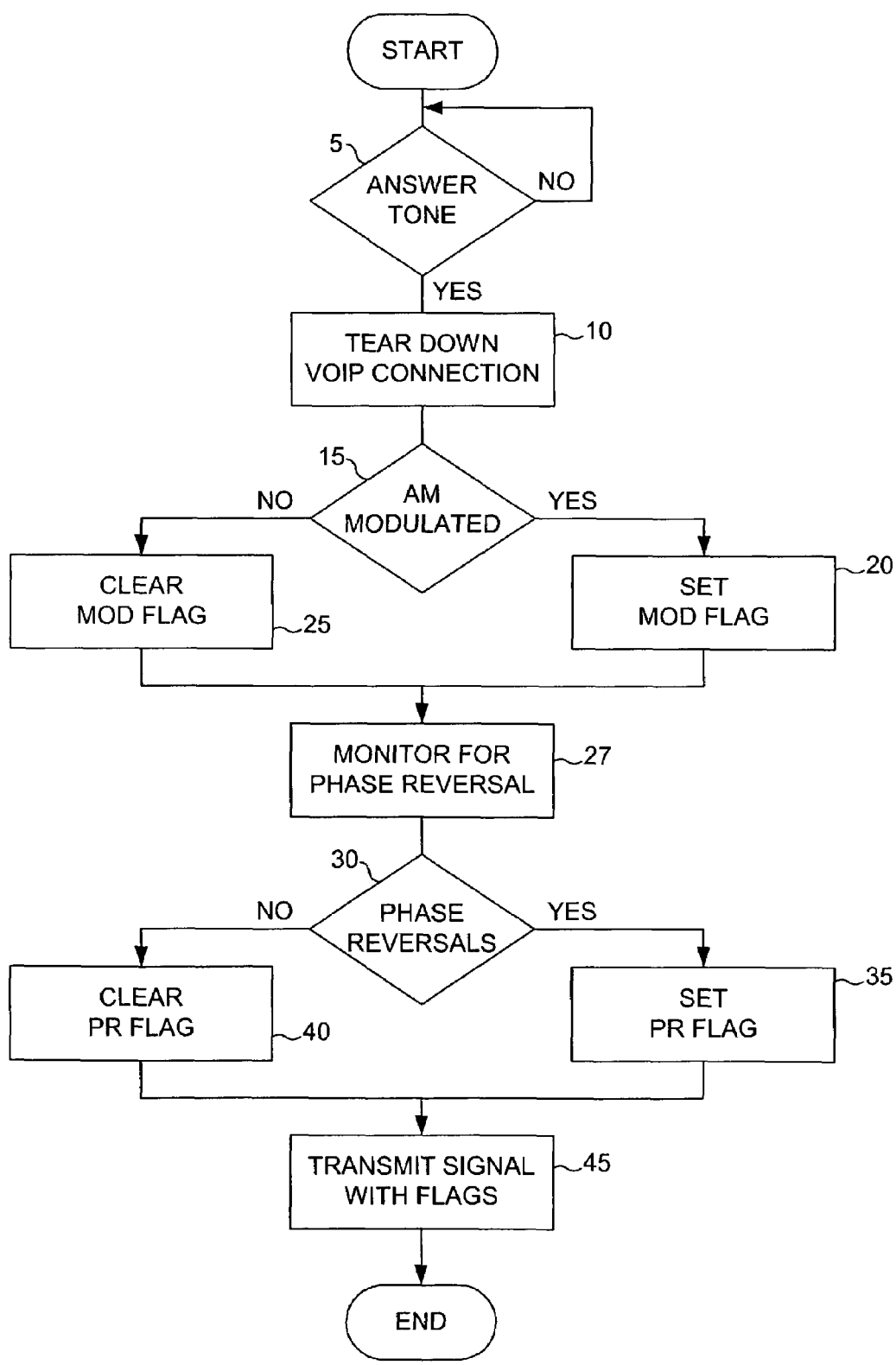
FIG. 1 is a diagram illustrating one method for communicating an answer tone from an answering modem to a calling modem over a data network.

FIG. 1 is a diagram illustrating one method for communicating an answer tone from an answering modem to a calling modem over a data network. An answering-side gateway may first detect an answer tone (step 5). Because the answering-side gateway can infer that a data connection is about to be established over a VoIP channel, it may then optionally tear down a VoIP channel (step 10) that was used to call the answering modem.

In order to establish a MoIP connection, the answering-side gateway must signal a calling-side gateway that an answer tone has been detected. In order to do this, the answering-side gateway must first classify the type of answer tone that was detected. According to various modem, echo suppressor and echo canceler design specifications and recommendations, there are several types of answer tones that must be recognized. The table immediately below summarizes the most common forms of answer tones presently in use:

| Modem Type | Tone Frequency | Phase Reversals | Carrier Modulated |
|---|---|---|---|
| Standard G3 Facsimile (T.30/T.4) | 2100 Hz | No | No |
| V.34 Facsimile (T.30 Annex F) | 2100 Hz | No | Yes |
| Pre-V.34 Data Modems | 2100 Hz | Yes | No |
| All V.8 Data Modems | 2100 Hz | Yes | Yes |

As can be seen from this table, two basic characteristics must typically be detected in order to classify an answer tone; whether the answer tone exhibits phase reversals and whether the answer tone is modulated by a carrier signal.

According to this method, the answering-side gateway may immediately determine if the answer tone is amplitude modulated by a carrier (step 15). Based on this, a flag indicative of this characteristic may be set (step 20) or cleared (step 25). In order for the answering-side gateway to determine if phase reversals are present in the answer tone, it must continue to monitor the tone for some minimum amount of time (step 27). The G.165 and G.168 echo canceler design recommendations state that phase reversals must occur with a period of 450 milliseconds (ms). The answering-side gateway may detect a phase reversal almost immediately, or it may need to continue to monitor the answer tone for as long as 450 ms or longer. If phase reversals are detected (step 30) a phase reversal (PR) flag may then be set (step 35). If the answering-side gateway fails to detect a phase reversal within the allotted monitoring period, it may need to clear the PR flag (step 40).

Once the answering-side gateway has classified the answer tone, it may send a signal to the calling-side gateway together with the classification flags (step 45). The calling-side gateway may then reproduce the answer tone according to the classification flags and convey the answer tone to the calling modem. This prior art method may prove ineffective because of the latency introduced by classifying the answer tone. This latency may cause the MoIP connection to fail in a connection establishment phase.

Figure 2:
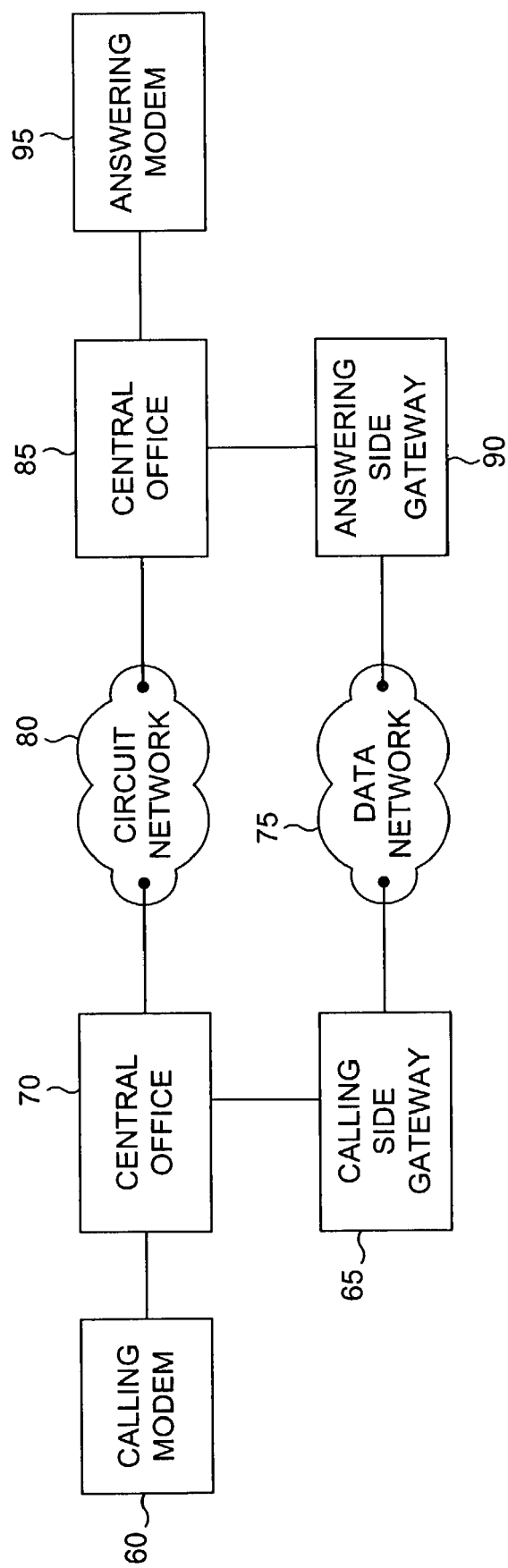
FIG. 2 is a block diagram that illustrates one common method for using a digital communications network to allow modems to communicate with each other.

FIG. 2 is a block diagram that illustrates one common method for using a digital communications network to allow modems to communicate with each other. Normally, when a calling modem 60 initiates a phone call to an answering modem 95, the phone call is received by a first central office 70. The first central office 70 digitizes the analog telephony signal carrying the modem signal and conveys this to a PSTN virtual circuit network 80. The phone call may then be received by a second central office 85 where it is siphoned off of the virtual circuit network 80 and converted to an analog signal. This is then conveyed to the answering modem 95. When the same phone call is established using VoIP across a general purpose data network 75, the calling modem 60 may also be connected to a first central office 70. In order to provide voice telephony, a calling-side access gateway 65 may receive a telephony signal from the central office 70. According to one variation of the inventive method, analog telephone signals may be directed to the access gateway 65 where they are typically digitized by a codec. The calling-side access gateway 65 may then establish a VoIP connection with an answering-side access gateway 90.

The answering-side access gateway 90 may then receive digitized telephony by way of the VoIP channel established with the calling-side gateway. The answering-side access gateway may then convert the digitized telephony into an analog signal using a codec and direct this to a second central office 85. The second central office 85 may then forward the analog telephony signal to an answering modem 95.

Figure 3:
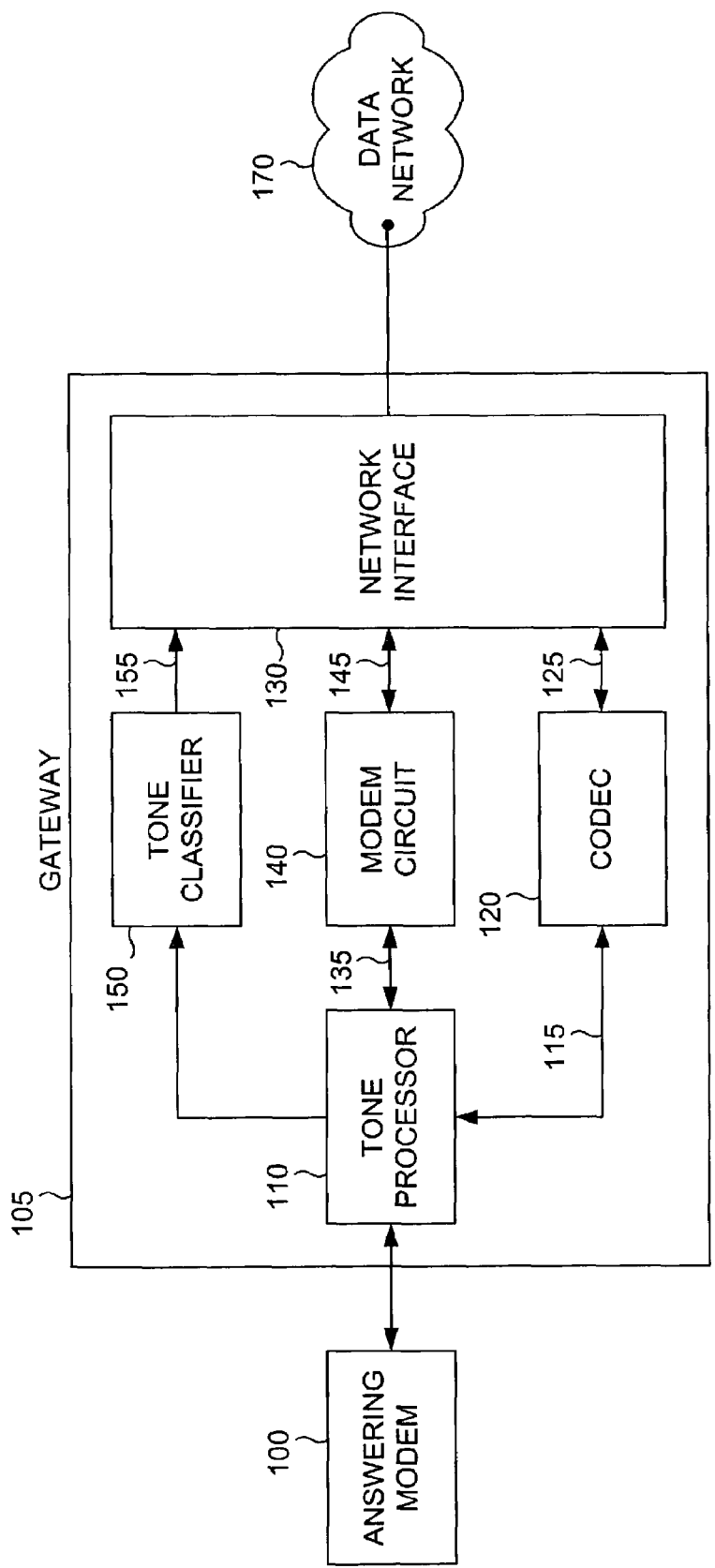
FIG. 3 is a block diagram of one illustrative embodiment of an access gateway capable of dispatching an answer tone event message to a data network in response to an answer tone received from an answering modem according to the present invention.

FIG. 3 is a block diagram of one illustrative embodiment of an access gateway capable of dispatching an answer tone event message to a data network in response to an answer tone received from an answering modem according to the present invention. According to this illustrative embodiment, an access gateway 105 may comprise a tone processor of 110, a codec 120, a modem circuit 140, a tone classifier 150 and a network interface 130. As previously discussed, a calling modem may initiate a telephone call to an answering modem 100 connected to an access gateway 105. A voice channel is typically established by receiving a digital data stream at a network interface 130 and conveying the digital data stream to a codec 120. The output of the codec 120 comprises an analog telephone signal 115 that may be directed through a tone processor 110 to an analog telephone interface comprising the access gateway 105. The answering modem 100 may then receive the telephone call carried by the voice channel.

Once the answering modem 100 answers the incoming telephone call, it typically generates an answer tone and directs that answer tone to the answering-side gateway 105. The answer tone is typically conveyed by means of a modulated analog signal generated by the answering modem. The tone processor 110 comprising the answering-side gateway 105 comprises a tone detector and a switching unit. The switching unit is capable of routing the modulated analog signal either to the tone classifier 150 or to the modem circuit 145. Routing of the modulated analog signal to either of these is accomplished by detecting the presence of an answer tone in the modulated analog signal and then directing the switching unit accordingly.

In the case where the modulated analog signal is directed to the tone classifier 150, the tone classifier may generate a first-level classification of the answer tone. The tone classifier may conduct additional subsequent answer tone classifications. One such subsequent classification may be a second-level classification of the answer tone if the answer tone is of a designated type. According to one illustrative embodiment of the present invention, the tone classifier 150 may generate a first-level classification based on whether or not the answer tone is carried by a carrier signal. In one embodiment of the present invention, the tone classifier 150 may recognize that the answer tone is amplitude modulating a 15 Hertz carrier. In yet another embodiment, the tone classifier 150 may generate a second-level classification based on whether or not the answer tone exhibits a phase reversal. In some embodiments, the tone classifier 150 may recognize phase reversals that occur periodically with a period of approximately 450 ms.

The output of the tone classifier 150 may typically comprise a first-level flag or a second-level flag or yet another subsequent classification flag. When either a first-level flag, second-level flag or other subsequent classification flag is conveyed to the network interface 130, the network interface 130 generates a tone event message comprising any flag it may receive and conveys this tone event message to the data network 170.

Once the tone processor 110 recognizes the lack of an answer tone, the modulated analog signal from the answering modem 100 is forwarded 135 to the modem circuit 140. The modem circuit 140 demodulates the modulated analog signal in order to generate a digital data stream that is conveyed 145 to the network interface 130. The network interface 130 may then forward the digital data stream to the data network 170 in order to establish a modem-over-IP connection with a calling-side gateway.

Figure 4:
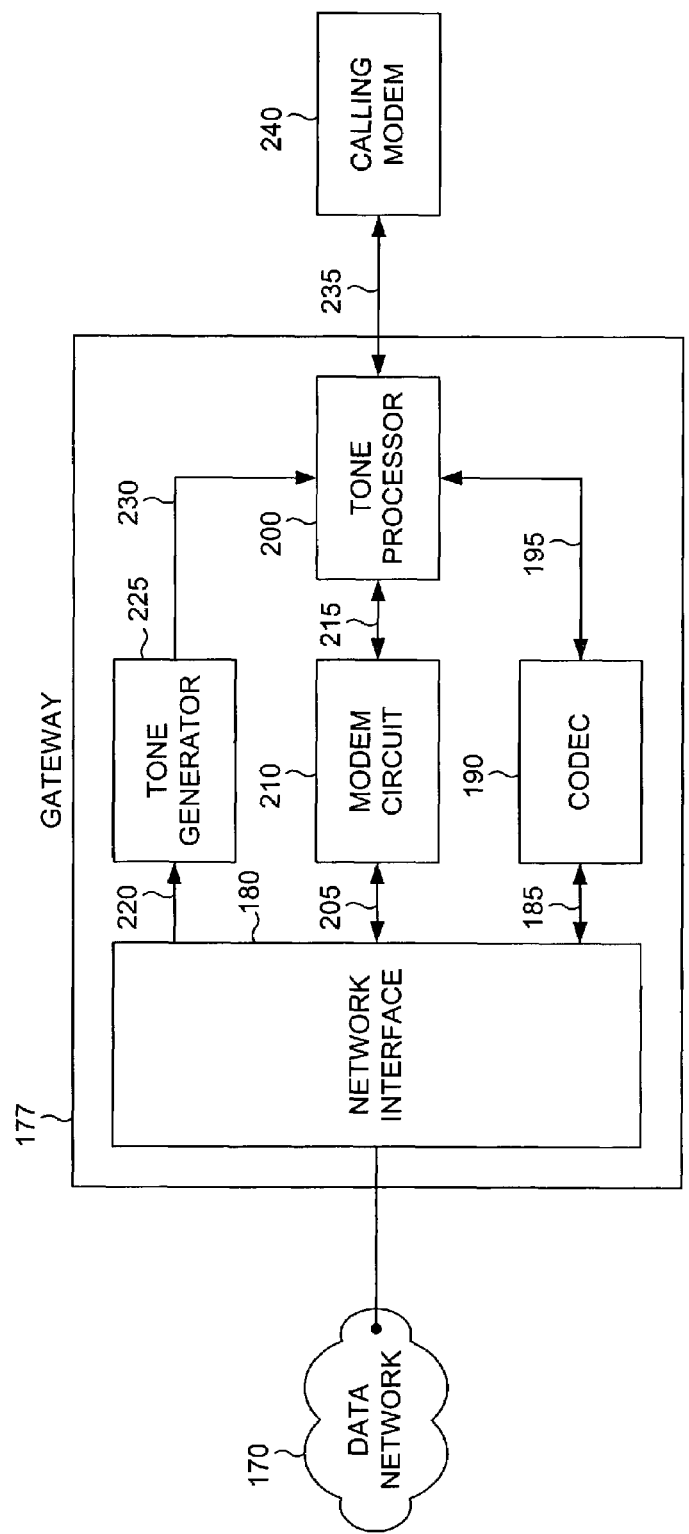
FIG. 4 is a block diagram of an access gateway according to one example embodiment of the present invention that is capable of generating and subsequently adjusting an answer tone according to answer tone event messages received from a data network.

FIG. 4 is a block diagram of an access gateway according to one example embodiment of the present invention that is capable of generating and subsequently adjusting an answer tone according to answer tone event messages received from a data network. When a tone event message is received by a calling-side gateway 177 from a data network 170, the tone event message is processed by a network interface 180 comprising the gateway 177. The network interface 180 forwards the tone event message to a tone generator 225 that also comprises the calling-side gateway 177. The tone generator 225 may extract a first-level flag from a tone event message and generate an answer tone according to the first-level flag. The answer tone generated by the tone generator 225 may then be conveyed 230 to a tone processor 200 that may further comprise the calling-side gateway 177. The tone generator 225 may then regenerate the answer tone according to the first-level flag comprising the first tone-event message it receives. In one alternative embodiment of the present invention, the tone generator may generate an answer tone that may or may not modulate a carrier signal according to the first-level classification flag. The tone generator may cause the answer tone to modulate a 15 Hertz carrier signal. It should be noted that the actual frequency may vary according but typically will be within tolerances established by industry specifications noted above.

The tone generator may also adjust the regenerated answer tone in response to subsequent tone event messages that may comprise additional classification flags. In one example embodiment of the present invention, the tone generator may respond to a second-level classification. Such a response may comprise the adjustment of the regenerated answer tone so that the regenerated answer tone exhibits phase reversal. The tone generator may cause the phase reversals to occur approximately every 450 ms. Industry specifications that serve to guide modem design allow for tolerances in the phase reversal period. The present invention is intended to embrace these tolerances.

The network interface 180 may also receive MoIP traffic from the data network 170. This may be in the form of a digital data stream 205 that may be conveyed to a modem circuit 210 that may further comprise the calling-side gateway 177. The modem circuit 210 typically generates a modulated analog signal 215 according to the digital data stream 205. The modulated analog signal 215 is also conveyed to the tone processor 200. The tone processor 200 combines the answer tone generated by the tone generator 225 and the modulated analog signal 215 and forwards this combined signal 235 to the calling modem 240. It should be noted that the calling modem 240 may have first initiated a data call to the answering modem 100 through a voice channel carried by the data network 170. In one embodiment, the voice channel is carried through the tone processor 200 and directed to a codec 190 that comprises the calling-side gateway 177. The codec 190 typically generates a digital data stream representative of the analog telephony signal used by the calling modem 240 to initiate the data call. The network interface 177 may then forward the digital data stream from the codec 190 to the data network 170.

Figure 5:
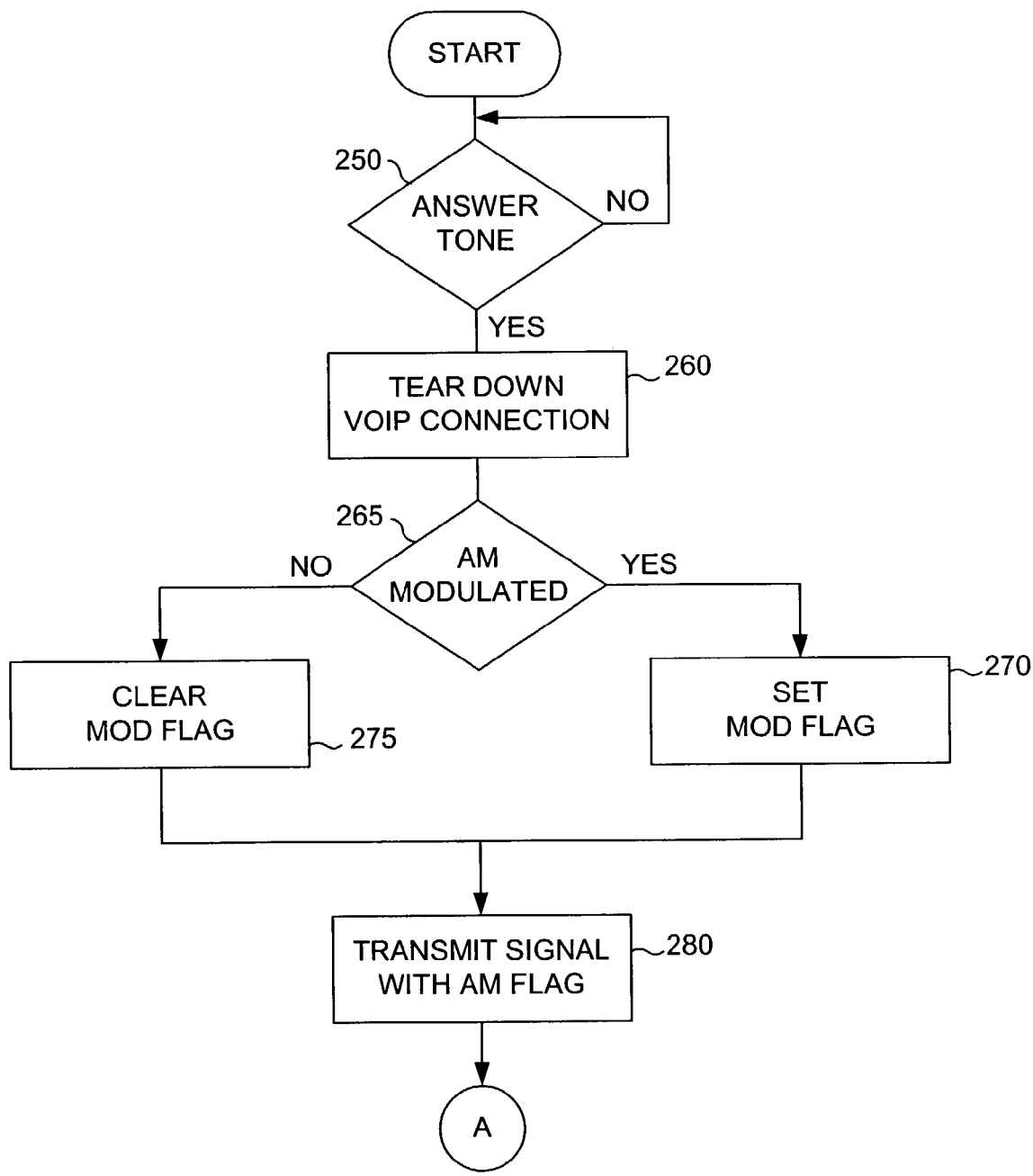
FIGS. 5 and 6 are two parts of a flow diagram that depict one example method of dispatching a first-level, answer-tone classification message to a data network according to the present invention.
Figure 6:
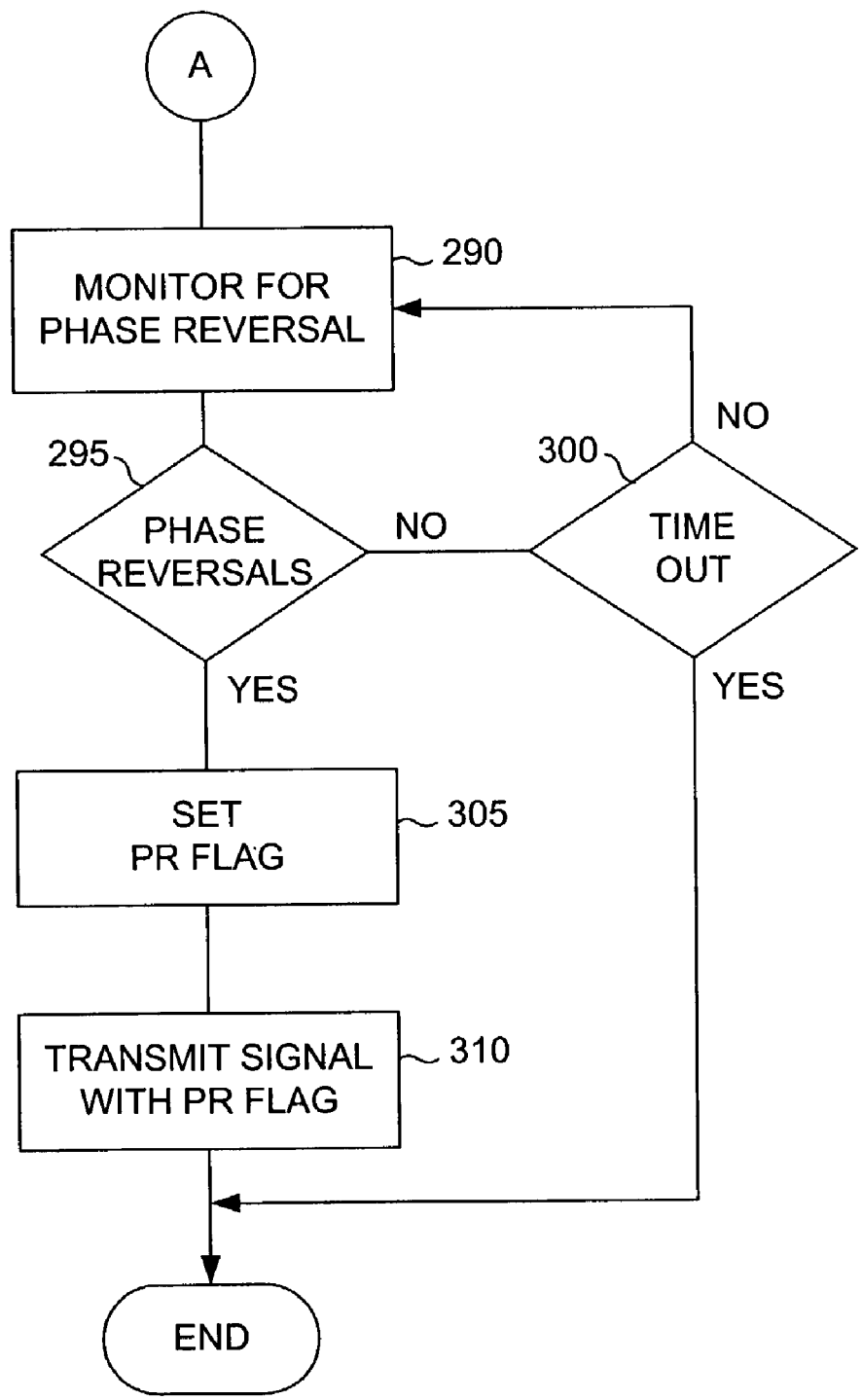

FIGS. 5 and 6 are two parts of a flow diagram that depict one example method of dispatching a plurality of classification messages to a data network according to the present invention. In this illustrative method, an answering-side gateway will monitor an analog signal received from an answering modem. If an answer tone is detected (step 250), the answering-side gateway may tear down a voice channel that the calling modem used to initiate a data call with the answering modem (step 260). Tearing down the voice channel may be accomplished by tearing down a VoIP connection. Tearing down the voice channel may be an entirely optional step.

After the voice channel is torn down, the answering-side gateway may then classify the answer tone on a first level (step 265). This first level classification may comprise determining whether an answer tone is carried by a carrier signal. The method of the present invention may recognize that the carrier is a 15 Hertz signal and is amplitude modulated by the answer tone. This determination may be recorded by setting or clearing a modulation flag (steps 270 or 275, respectively). Once the first level classification is accomplished, the answering-side modem may then transmit a signal (or message) to a calling-side gateway (step 280).

After the first-level classification is conveyed to the calling-side gateway, additional subsequent classifications may be made. In one inventive method, the answering-side gateway may continue to monitor (step 290) the answer tone in order to perform a second-level classification (step 295). The second level classification may be comprised of determining if the answer tone received from an answering modem exhibits phase reversals. The method of the present invention may recognize that phase reversals occur regularly with a period of approximately 450 ms. This classification may be recorded in a second-level classification flag (step 305). The continued monitoring of the answer tone may be subject to a timer (step 300). If the timer expires, the classification process is typically terminated. When a second level classification is of a designated type (i.e. such as a phase reversal), the method of the present invention provides for the transmission of a second signal to the calling-side gateway with a second-level classification flag (step 310). Note that if the second-level classification does not meet a certain criteria, such as membership in a particular group of classification types, the method of the present invention provides that an answering-side gateway may not send a message at all.

Figure 7:
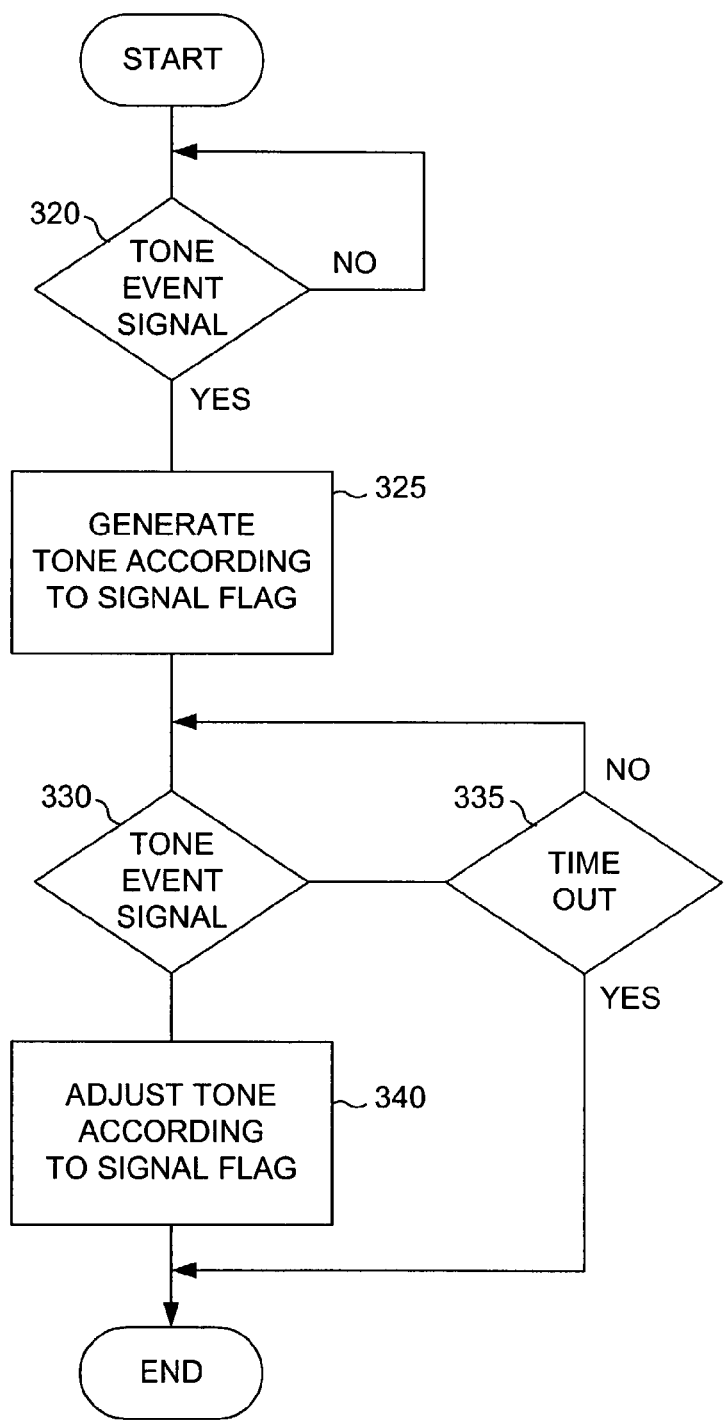
FIG. 7 is a flow diagram that depicts one illustrative method for generating an answer tone in response to an answer tone event message received by a calling-side gateway from a data network according to the present invention.

FIG. 7 is a flow diagram that depicts one illustrative method for generating an answer tone in response to an answer tone event message received by a calling-side gateway from a data network according to the present invention.

In accordance with the teachings of the present invention, a calling-side gateway may generate an answer tone to a calling modem when it receives a tone event message (step 320) from a data network. The calling-side gateway may use a first-level classification flag comprising a tone event message to determine what type of answer tone should be generated (step 325). According to one example of the present method, the answer tone may be varied by either imposing the answer tone onto a carrier signal or generating an answer tone that does not modulate a carrier.

Once the calling-side gateway begins generating the answer tone, it may subsequently receive another answer tone event message from the data network (step 330). The calling-side gateway may subject subsequent answer tone event messages to a timer (step 335). The calling-side gateway will typically adjust the answer tone in accordance with a second-level classification flag that may be received with the subsequent answer tone event message (step 340). One example of such an adjustment may be to inject a phase reversal into the answer tone generated by the calling-side gateway if the second-level classification indicates that the answer tone received by the answering-side gateway exhibited such phase reversals.

What is claimed is:

1. A communication method for use by a first gateway device in communication with a second gateway device over a packet network, the first gateway device further in communication with an originating modem over a first telephone line and the second gateway device further in communication with an answering modem over a second telephone line, the method comprising:

receiving a first message from the second gateway device, wherein the first message is indicative of a first answer tone classification by the second gateway device based on a first answer tone generated by the answering modem;

determining whether the first message is indicative of either a modulated answer tone or a non-modulated answer tone;

generating a second answer tone based on the determining;

transmitting the second answer tone to the originating modem;

receiving a second message from the second gateway device after the generating the second answer tone based on the determining and during the transmitting the second answer tone, wherein the second message is indicative of a second answer tone classification by the second gateway device based on the first answer tone generated by the answering modem;

determining whether the second message is indicative of the first answer tone being with a phase reversal or without a phase reversal; and causing a phase reversal for the second answer tone during the transmitting the second answer tone if the second message is indicative of the first answer being with the phase reversal.

2. The method of claim 1, wherein the first message indicates either a V.25 ANS or a V.8 ANSam.

3. The method of claim 2, wherein if the first message indicates the V.8 ANSam, the method further comprising: bypassing the receiving the second message, and causing the phase reversal for the second answer tone.

4. A communication method for use by a first gateway device in communication with a second gateway device over a packet network, the first gateway device further in communication with an answering modem over a first telephone line and the second gateway device further in communication with an originating modem over a second telephone line, the method comprising:

detecting an answer tone from the answering modem;

analyzing the answer tone to determine whether the answer tone is a modulated answer tone or a non-modulated answer tone;

classifying the answer tone based on the analyzing to generate a first answer tone classification;

transmitting a first message indicative of the first answer tone classification to the second gateway device;

examining the answer tone to determine whether the answer tone is with a phase reversal or without a phase reversal;

classifying the answer tone based on the examining to generate a second answer tone classification after the transmitting the first message indicative of the first answer tone classification to the second gateway device; and transmitting a second message indicative of the second answer tone classification to the second gateway device.

5. The method of claim 4, wherein the first message indicates either a V.25 ANS or a V.8 ANSam.

6. The method of claim 5, wherein if the first message indicates the V.8 ANSam, the method further comprising: bypassing the examining the answer tone, bypassing the classifying the answer tone based on the examining, and bypassing the transmitting the second message.

7. The method of claim 4 further comprises preventing the answer tone from reaching the second gateway device after the detecting the answer tone.

8. A first gateway device configured to communicate with a second gateway device over a packet network, the first gateway device further configured to communicate with an originating modem over a first telephone line and the second gateway device configured to communicate with an answering modem over a second telephone line, the first gateway device comprising:

a receiver configured to receive a first message from the second gateway device, wherein the first message is indicative of a first answer tone classification by the second gateway device based on a first answer tone generated by the answering modem;

a tone generator configured to generate a second answer tone based on determining whether the first message is indicative of either a modulated answer tone or a non-modulated answer tone;

a transmitter configured to transmit the second answer tone to the originating modem;

the receiver further configured to receive a second message from the second gateway device after the generator generating the second answer tone based on the determining and during the transmitter transmitting the second answer tone, wherein the second message is indicative of a second answer tone classification by the second gateway device based on the first answer tone generated by the answering modem;

wherein the first gateway device is configured to determine whether the second message is indicative of the first answer tone being with a phase reversal or without a phase reversal, and to cause a phase reversal for the second answer tone during the transmitter transmitting the second answer tone if the second message is indicative of the first answer being with the phase reversal.

9. The first gateway device of claim 8, wherein the first message indicates either a V.25 ANS or a V.8 ANSam.

10. The first gateway device of claim 9, wherein if the first message indicates the V.8 ANSam, the first gateway device is further configured to bypass receiving the second message, and causing the phase reversal for the second answer tone.

11. A first gateway device configured to communicate with a second gateway device over a packet network, the first gateway device further configured to communicate with an answering modem over a first telephone line and the second gateway device configured to communicate with an originating modem over a second telephone line, the first gateway device comprising:

a detector configured to detect an answer tone from the answering modem;

a classifier configured to classify the answer tone to generate a first answer tone classification based on analyzing the answer tone to determine whether the answer tone is a modulated answer tone or a non-modulated answer tone;

a transmitter configured to transmit a first message indicative of the first answer tone classification to the second gateway device;

the classifier further configured to classify the answer tone to generate a second answer tone classification, based on examining the answer tone to determine whether the answer tone is with a phase reversal or without a phase reversal, after the transmitter transmitting the first message indicative of the first answer tone classification to the second gateway device; and the transmitter further configured to transmit a second message indicative of the second answer tone classification to the second gateway device.

12. The first gateway device of claim 11, wherein the first message indicates either a V.25 ANS or a V.8 ANSam.

13. The first gateway device of claim 12, wherein if the first message indicates the V.8 ANSam, the first gateway device is further configured to bypass: examining the answer tone, classifying the answer tone based on the examining, and transmitting the second message.

14. The first gateway device of claim 11, wherein the first gateway device is configured to prevent the answer tone from reaching the second gateway device after the detecting the answer tone.

* * * * *